UNITED STATES PATENT OFFICE.

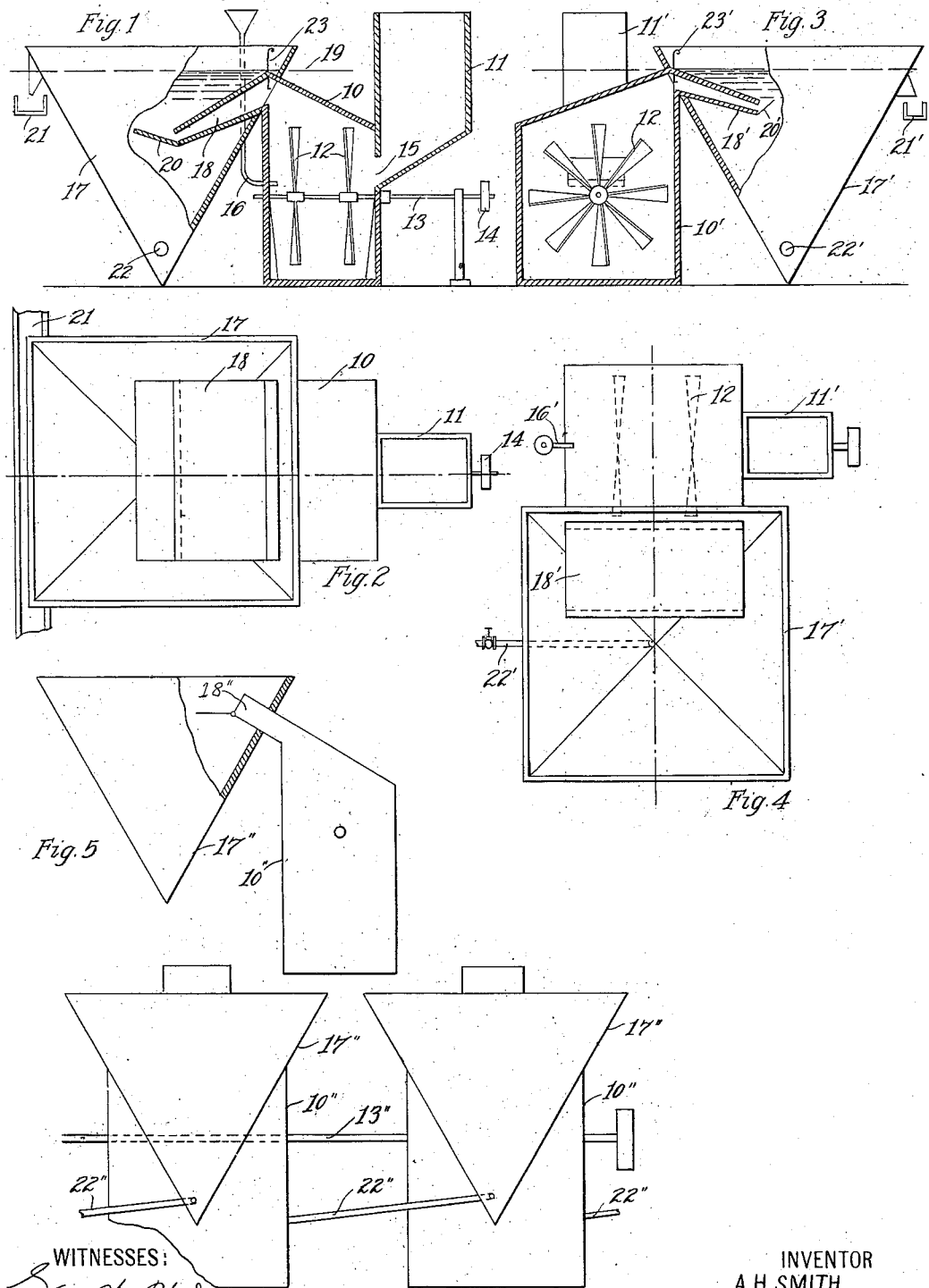
A. H. SMITH.
ORE MIXING AND SEPARATING APPARATUS.
APPLICATION FILED MAY 7, 1912.
1,058,111. Patented Apr. 8, 1913.
INVENTOR
A.H. SMITH
ATTORNEY

ALEXANDER H. SMITH, OF GLASGOW, SCOTLAND.

ORE MIXING AND SEPARATING APPARATUS.

1,058,111.  Specification of Letters Patent.  Patented Apr. 8, 1913.

Application filed May 7, 1912. Serial No. 695,695.

*To all whom it may concern:*

Be it known that I, ALEXANDER HERBERT SMITH, a subject of the King of Great Britain and Ireland, residing in Glasgow, Scotland, have invented a new and useful Ore Mixing and Separating Apparatus; and I do hereby declare the following to be a full, clear, and exact description of the same.

This invention relates to an apparatus for mixing finely ground ore with any matter, for instance oil or grease, in such a way as to make the economic portion of the ore float after it has passed through the apparatus.

In the accompanying drawing, showing, by way of example, apparatus for this purpose, Figure 1 is a side elevation, partly in section, of one form of apparatus; Fig. 2 is a plan of the same; Figs. 3 and 4 are side elevations, partly in section, and a plan of another form of apparatus; and Figs. 5 and 6 are end and side elevations diagrammatically showing apparatus similar to that of Figs. 3 and 4, arranged in series on the same line of shafting.

Referring now particularly to Figs. 1 and 2, the apparatus is shown comprising a mixer 10, a feed box 11 and centrifugal fans 12 mounted on a shaft 13 provided with a pulley 14. The ground ore mixed with water is sucked in by the fans from the feed box through opening 15. At the same time oil or a mixture of oil and air is forced under pressure or simply sucked into the mixer through the feed pipe 16. The fans revolve at the rate of about 300 revolutions per minute and send both ingredients to the periphery of the fans, and the resulting mixture passes out into the spitzkasten 17 by way of the conduit 18 and is discharged into the water some distance below the water level 18 as shown. The coarser portions of the feed material as well as the lighter portions are brought by the fans into thorough contact with the oil. The conduit 18 is made of such a length that the mixture comes almost to a state of rest and oozes into the spitzkasten, thus disturbing the water surface very little.

A regulator or leaf 20 is hinged at the end of the conduit and can be adjusted through an angle of 180° and thus direct the mixture into the spitzkasten at any desired angle. The usual concentrate launder 21' and tailing pipe 22' are provided. In order to control the amount of mixture passing through the conduit 18, an adjustable gate 23 is provided which may be adjusted to give the desired amount of opening. By this arrangement the air and oil bubbles are intimately mixed with the water and air. It will be noted that the mixing portion is below the water level thus preventing the escape and accumulation of air bubbles before the spitzkasten is reached. The conduit 18 may be placed at any angle desired, for instance, as shown in Fig. 1 or as shown at 18' in Fig. 3 or as shown at 18'' in Fig. 5.

In the apparatus of Figs. 3 and 4 the spitzkasten 17, is disposed to one side of the mixer 10' so that it is possible to have several apparatus on one line of shafting. In this case the conduit 18' projects from the mixer 10', the feed box 11', the feed pipe 16', the concentric launder 21', the tailing pipe 22' and the gate 23' are similar to those of Figs. 1 and 2. The apparatus can be disposed so that the tailings of one machine can be sucked into the mixer of the succeeding machine, thus doing away with a pump. Such an arrangement is shown diagrammatically in Figs. 5 and 6, these figures being end and side elevations, respectively. In this arrangement the tailing pipes 22'' lead from the spitzkasten 17'' to the succeeding mixers 10'' and the mixers are all run from the same shaft 13''.

It is understood that the dimensions and proportions shown are for illustrative purposes only and that the dimensions, proportions and details of construction may be greatly varied without departing from the scope of the invention as claimed.

I claim as my invention:

1. In an ore mixing and separating apparatus, the combination of a mixer casing having a closed top; means for feeding material to be separated and a frothing reagent into the casing; a propeller fan mounted in the casing and adapted to throw said material to the upper part of the casing; a decanting separator; and a conduit leading from said upper part of the mixer and having a discharge end projecting into the decanting separator below the water level thereof.

2. In an ore mixing and separating apparatus, the combination of a mixer casing having a closed top; means for feeding material to be separated and a frothing reagent into the casing; a propeller fan mounted in the casing and adapted to throw said material to the upper part of the casing; a decanting separator; and a conduit of greater length than depth leading from said upper part of the mixer and having a discharge end projecting into the decanting apparatus below the water level thereof.

3. In an ore mixing and separating apparatus, the combination of a mixer casing having a closed top; means for feeding material to be separated and a frothing reagent into the casing; a propeller fan mounted in the casing and adapted to throw said material to the upper part of the casing; a decanting separator; and a conduit leading from said upper part of the mixer and having a discharge end projecting into the decanting separator below the water level thereof, said closed top sloping upwardly toward the inlet end of said conduit.

4. In an ore mixing and separating apparatus, the combination of a mixer casing having a closed sloping top; a propeller fan mounted in said casing; feed means for a material to be separated and a frothing reagent; a decanting separator; and a sloping conduit of greater length than depth communicating with the upper part of the casing adjacent to the uppermost part of said sloping top and discharging beneath the water level of the decanting separator.

5. In an ore mixing and separating apparatus, the combination of a mixer casing having a closed sloping top; a propeller fan mounted in said casing; feed means for a material to be separated and a frothing reagent; a decanting separator; and a slop-conduit of greater length than depth communicating with the upper part of the casing adjacent to the uppermost part of said sloping top and discharging beneath the water level of the decanting separator; and an adjustable gate in the conduit and a pivoted regulator secured to the free end of the conduit.

6. In an ore mixing and separating apparatus, the combination of a series of decanting separators; a mixer casing for each separator and extending below the lowest part of the separator; a conduit connecting each mixer casing with its corresponding separator; a downwardly sloping discharge pipe connecting the bottom of each separator with the succeeding mixer casing at a point lower than the lowest point of its corresponding separator; and a propeller in each casing and adapted to lift ore from its lower part and force it out through the conduit.

7. In an ore mixing and separating apparatus, the combination of a series of decanting separators; a mixer casing for each separator, each extending below the lowest part of each separator; a discharge conduit leading from the upper part of each mixer casing and discharging under the water level of the corresponding separator; downwardly sloping pipes connecting the bottom part of each separator to the lower part of the succeeding mixer casing at a point lower than the lowest part of the corresponding separator; and a propeller in each mixer casing adapted to lift one mixture from the lower part thereof and force it out through the conduit.

8. In an ore mixing and separating apparatus, the combination of a series of decanting separators; a mixer casing for each separator, each extending below the lowest part of each separator; a discharge conduit leading from the upper part of each mixer casing and discharging under the water level of the corresponding separator; continuously downwardly sloping pipes connecting the bottom part of each separator to the lower part of the succeeding mixer casing at a point lower than the lowest part of the corresponding separator; a propeller in each mixer casing adapted to lift one mixture from the lower part thereof and force it out through the conduit; and a horizontal shaft passing through all of the mixer casings and on which the propellers are directly mounted.

In testimony whereof, I have signed my name to this specification in the presence of two subscribing witnesses.

ALEX. H. SMITH.

Witnesses:
D. R. McCORD,
EUGENE PECOT.